C. B. WILLIAMS.
POWER TRANSMITTING MECHANISM.
APPLICATION FILED AUG. 1, 1914.
1,189,026.
Patented June 27, 1916.
3 SHEETS—SHEET 1.
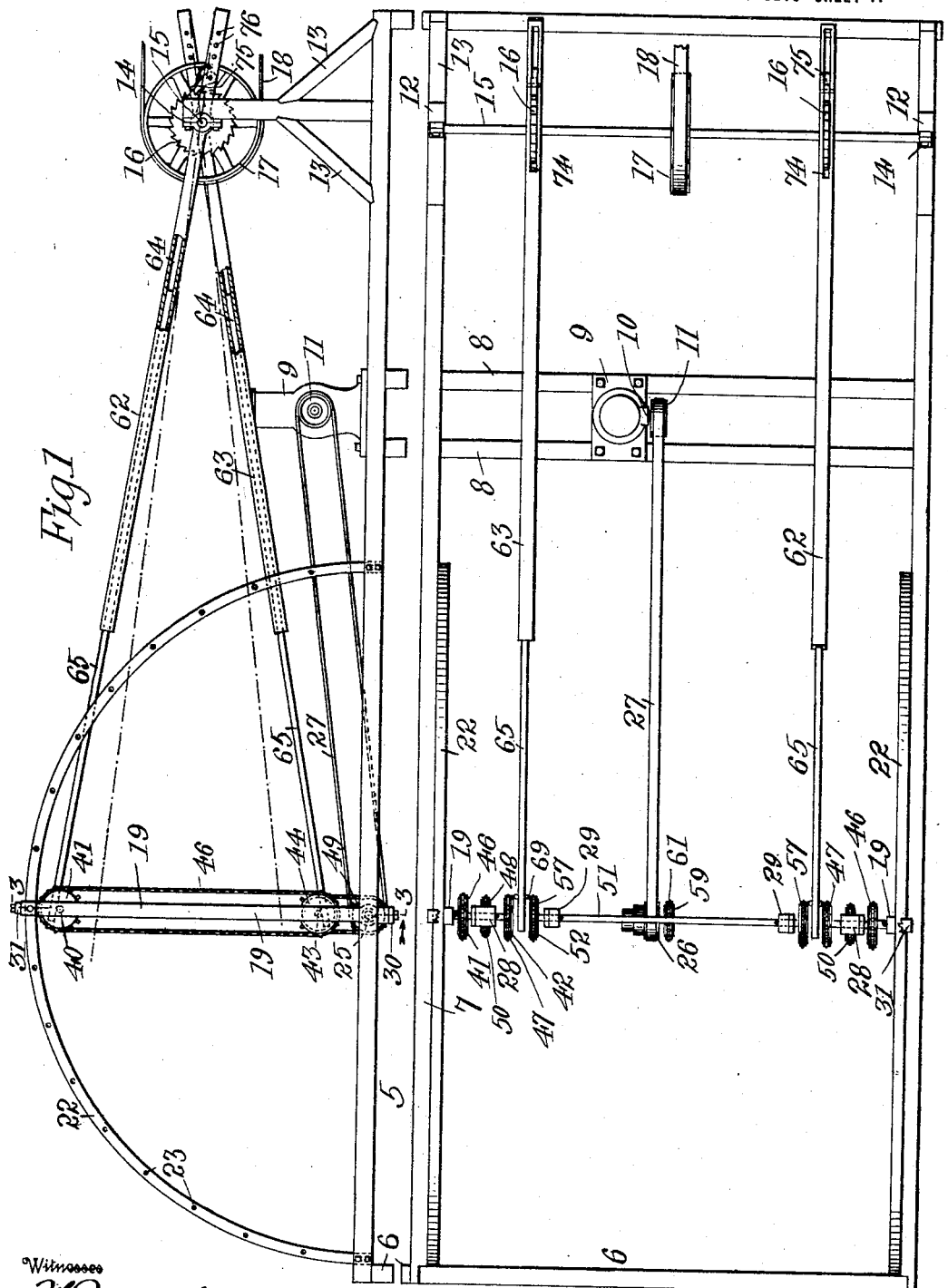

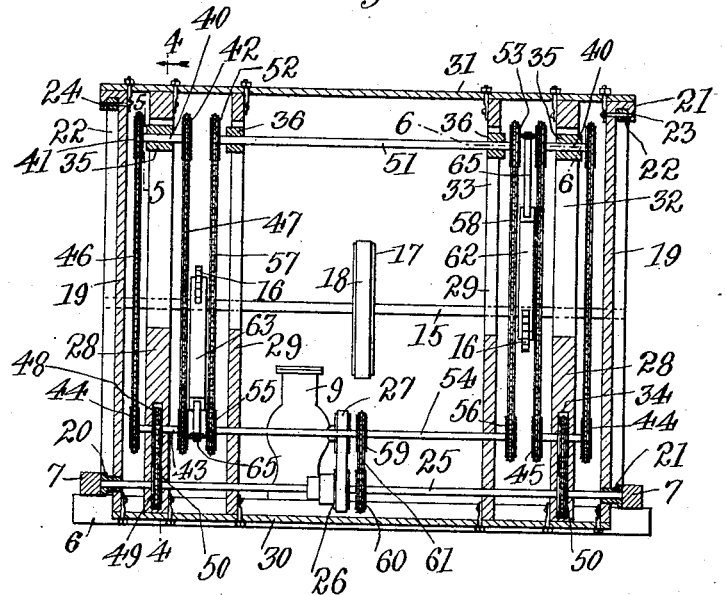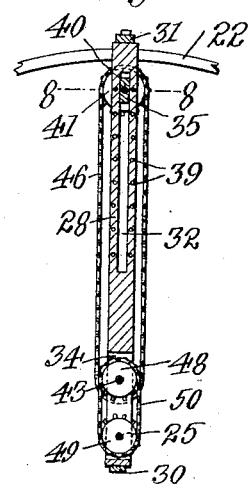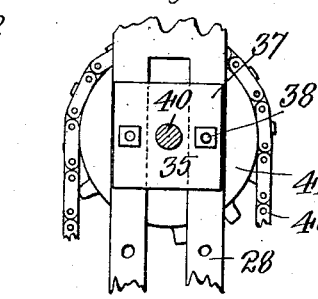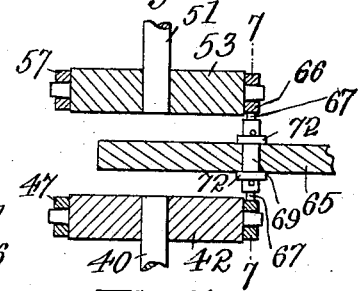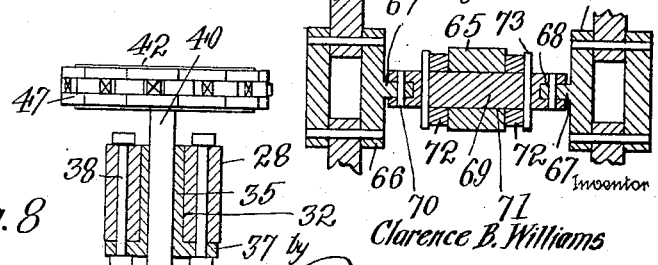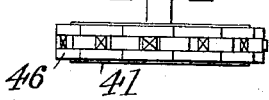

C. B. WILLIAMS.
POWER TRANSMITTING MECHANISM.
APPLICATION FILED AUG. 1, 1914.
1,189,026.
Patented June 27, 1916.
3 SHEETS—SHEET 3.
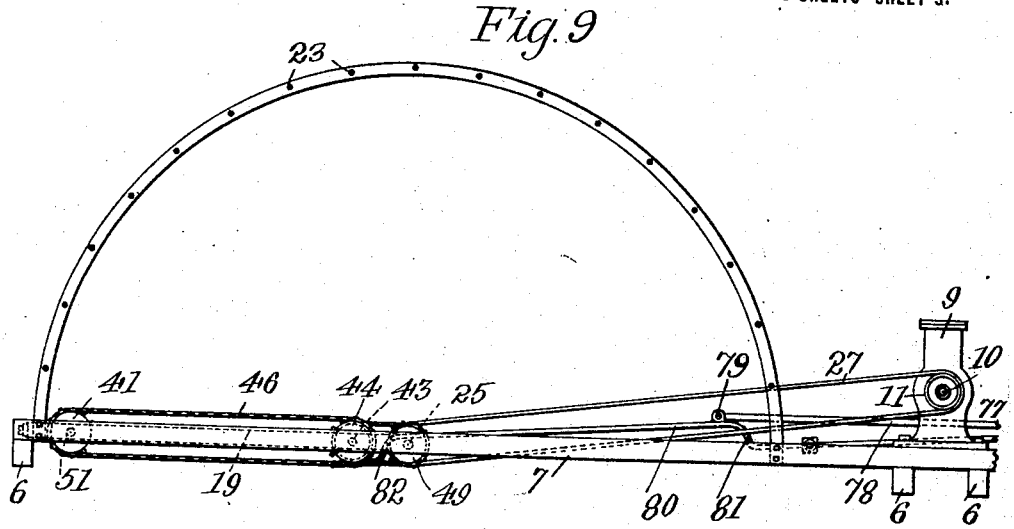
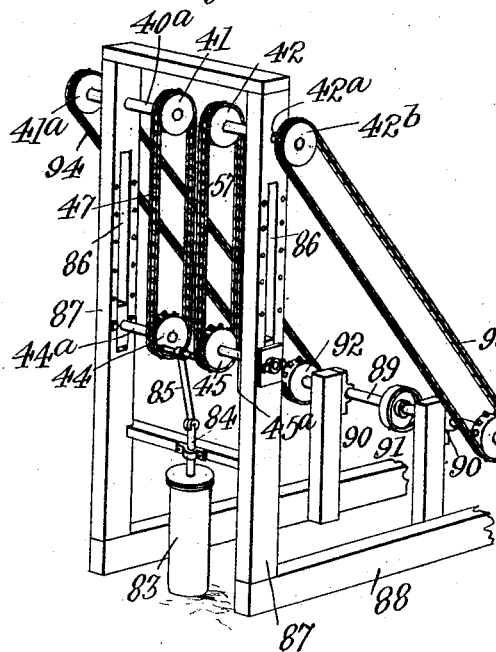
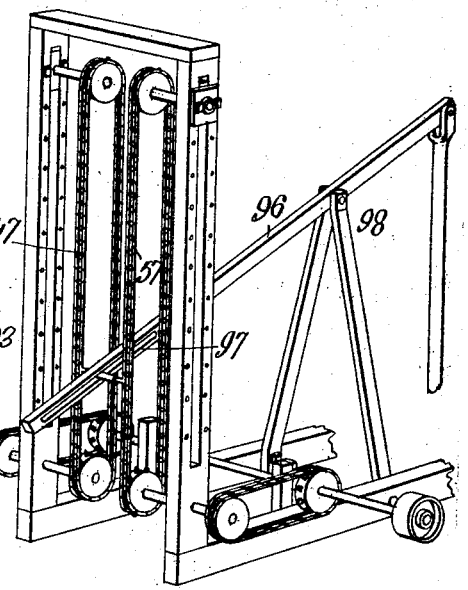
Inventor
Clarence B. Williams
by
James L. Norris
Attorney

UNITED STATES PATENT OFFICE.

CLARENCE B. WILLIAMS, OF PENCE, SASKATCHEWAN, CANADA.

POWER-TRANSMITTING MECHANISM.

1,189,026.  Specification of Letters Patent.  Patented June 27, 1916.

Application filed August 1, 1914. Serial No. 854,514.

*To all whom it may concern:*

Be it known that I, CLARENCE B. WILLIAMS, a citizen of the United States, residing at Pence, in the Province of Saskatchewan, Canada, have invented new and useful Improvements in Power-Transmitting Mechanism, of which the following is a specification.

This invention relates to power mechanism involving both power generation and motion conversion for general application as a means for increasing the given power of a steadily running prime motor relatively to a shaft or axle through the medium of a particular arrangement of sprocket wheels and chain belts to which the prime motor is connected and serves as the initial operating means, lever means being interposed between the driven element, such as a shaft, axle, rod or piston, and the chain belts and in some instances having a structure to compensate for the movement of the chain belts as they turn over or traverse the sprocket wheels over which they are trained and also the different distances the portions of the chain belts assume in their range of movement relatively to the driven shaft, axle, rod or piston. The chain belts are disposed in pairs in parallel relation with a clear intervening space between them and uniformly operated without the introduction of toothed gearing between them as a unifying movement means and thereby entirely eliminate friction and lost motion incident to toothed gearing. The improved mechanism also embodies novel forms of adjustment so that various applications thereof may be accomplished with material advantages and the stroke of the interposed transmission devices modified as may be desired or found necessary.

Other advantages will be hereinafter specified, together with the construction and arrangement of parts involving the particular features of the invention.

In the drawings: Figure 1 is a side elevation of a mechanism embodying the features of the invention. Fig. 2 is a top plan view of the same. Fig. 3 is a transverse vertical section taken in the plane of the line 3—3, Fig. 1. Fig. 4 is a transverse vertical section taken in the plane of the line 4—4, Fig. 3. Fig. 5 is a detail transverse section taken in the plane of the line 5—5, Fig. 3. Fig. 6 is a horizontal section taken in the plane of the line 6—6, Fig. 3. Fig. 7 is a transverse vertical section taken in the plane of the line 7—7, Fig. 6. Fig. 8 is a detail horizontal section taken in the plane of the line 8—8, Fig. 4. Fig. 9 is a side elevation of a modified form of the mechanism. Figs. 10 and 11 are perspective views showing essential features of the invention in two different forms of application.

The numeral 5 designates a base which, as shown by Figs. 1, 2 and 3, is preferably rectangular in shape and comprises suitable end and side bars 6 and 7 which may be of any dimensions adapted for the purpose of forming a rigid and stable base for supporting the mechanism. At a suitable distance from one end of the base, cross-supports 8 are located, and thereon is a prime motor 9 of any preferred form having a drive shaft 10 carrying a pulley 11. At a distance from the cross-supports 8 and adjacent to one end of the base are uprights 12, suitably braced as at 13, and having bearing devices 14 secured at their upper extremities for a power receiving shaft 15 provided in the present instance with a pair of ratchet wheels 16, preferably near opposite extremities of the shaft 15, and also with an intermediate pulley 17 from which power may be taken by a belt 18 to any suitable point. Near the opposite end of the base are uprights 19 which have a fulcrum support on bearing castings 20 secured to the inner portions of the side bars or members 7 of the base, the uprights 19 depending slightly below the side bars, as clearly shown by Figs. 1 and 3. The upper ends of the uprights 19 have outwardly projecting overhanging seats 21 to receive arcuate guides 22 of semicircular form and fixed at their ends to the side bars or members 7 of the base. The arcuate guides 22 are formed with a plurality of openings 23 and adapted to receive the bolts or securing devices 24 carried by the upper ends or seats 21 of the uprights 19 and whereby the entire structure, including the uprights 19 may be adjusted between the guides 22 for a purpose which will be hereinafter explained. Journaled in the bearing castings or bearing brackets 20 is a shaft 25 constituting a motion transmitting shaft and having thereon a pulley 26 over which and the pulley 11 of the prime motor 9 a belt 27 is trained. Adjacent to each upright 19 and inside of the latter are vertical supports 28 and 29 spaced apart a suitable distance and slightly projecting at their lower ends below the base 5 and all connected to a crossbrace 30. The upper ends of the vertical supports 28 and 29 are secured to a cross or cap bar 31 which extends over and bears at opposite ends on the upper ends or seats 21 of the uprights 24. The vertical supports 28 and 29 constitute carriers for the motion conversion elements that also assist in the increase of power relatively to the maximum power of the prime motor 9. The two outer supports or carriers 28 are heavier or thicker than the two inner supports or carriers 29, and both sets of carriers have upper longitudinal slots 32 and 33 of considerable length respectively formed therein, one in each carrier, and the lower portions of the carriers 28 have narrower longitudinal slots 34 extending therethrough in planes at right angles to the slots 32 above. In the slots 32 and 33 shiftable bearing members or blocks 35 and 36 are mounted and have flanged ends 37 engaged by bolts 38 which are adapted to engage openings 39 in the side portions of the said carriers for the purpose of adjustment of said members or blocks to change the stroke of the mechanism, all as clearly shown by Figs. 4, 5 and 6. The bearing members or blocks 35 are larger than the members or blocks 36 and each has a short shaft 40 extending therethrough having sprocket wheels 41 and 42 of similar dimensions on opposite ends thereof. Extending through each support or carrier 28 near the upper terminal or end wall of the lower slot 34 thereof is a shaft 43 also having sprocket wheels 44 and 45 on opposite ends thereof of similar dimensions and also duplicates in dimensions of the sprocket wheels 41 and 42, and trained over the sprocket wheels 41 and 44 is a chain belt 46, and trained over the sprocket wheels 42 and 45 is a chain belt 47. On the shaft 43 within the slot 34 a sprocket wheel 48 is keyed, and in the lower portion of said slot is a sprocket wheel 49 fixed on the shaft 25 which extends through the lower extremities of the carriers 28 and 29 and terminally engages the bearing castings or brackets 20. A chain belt 50 operatively engages each pair of sprocket wheels 49 and 48 so that the pairs of chain belts 46 and 47 at each side are regularly and uniformly driven from the motor 9 through the medium of the shaft 25 acting as the motion intermediary or motion transmitting means.

The chain belts 46 operate to steady and unify the movement of the inner chain belts 47 by assisting in maintaining a true running operation of the shafts 40 and 43 with less wear on the bearing means for said shafts. The bearing members or blocks 36 are adjustable vertically similarly to the bearing members or blocks 35; and mounted to rotate in the said blocks 36 is a crossshaft 51 having sprocket wheels 52 and 53 on the opposite ends, of the same dimensions as the sprocket wheels 41 and 42 and in transverse alinement with relation to the inner sprocket wheels 42. A second crossshaft 54 is mounted in the lower portion of the supports or carriers 29 and has sprocket wheels 55 and 56 on the opposite ends thereof, of the same dimensions as the sprocket wheels 43 and 45 and in transverse alinement with the inner sprocket wheels 45. Chain belts 57 and 58 are trained over the sprocket wheels 52 and 55 and 53 and 56 respectively, the said chain belts being separated from the adjacent belts 47 for the connection to the belts 47 and 58 of the device or devices to be operated thereby and permit free movement of the said device or devices between these belts. The shaft 54 at an intermediate point has a sprocket wheel 59 keyed thereon, and directly below and in alinement therewith a sprocket wheel 60 is secured on the shaft 25, a chain belt 61 operatively connecting the sprocket wheels 59 and 60 so that the shaft 54 is directly driven from the shaft 25 at the same rate of speed as the sprocket wheels 48 and chain belts 50 which rotate the sprocket wheels 49 and the shafts 43 to give a similar timed operation to the sprocket wheels 44, 45, 41 and 42 through the medium of the chain belts 46 and 47. In other words, the chain belts 47 and 48 have a similar timed movement or actuation or run at the same rate of speed.

As shown by Figs. 1, 2 and 3, two levers forming the power generating or increasing means are interposed between the shaft 15 and the chain belts 47 and 57 and 47 and 58 on the two sides of the mechanism just described. The same operation might ensue by the use of one lever and one set of chain belts without requiring any material change in the invention, and, moreover, the number of levers might be increased and the chain belts correspondingly multiplied to accommodate the additional levers. These levers 62 and 63 are formed tubular for a portion of their length, as at 64, and in the tubular portions are telescopic or extension members 65 which are directly connected at their outer ends to and regularly follow the movement of the chain belts 47 and 57 and 47 and 58, the free end of each extension member 65 being connected to the chain belts 47 and 57 and 47 and 58 at one side of said belts solely or at one point in connection with each belt, as clearly shown by Figs. 6 and 7. At the points where the extension members 65 are attached to the chain belts the links 66 have inwardly projecting bosses or lugs 67 over which the opposite slotted ends 68 of a cross-pin 69 are secured by key pins 70, each extension 65 having an opening 71 through which the cross-pin passes. The connected portion of each extension member 65 is held centrally with relation to its cross-pin 69 by washers 72 fitted over the cross-pin and bearing against opposite sides of the extension member, the washers being held against lateral movement by pins 73 inserted through the cross-pin 69 and closely bearing against the outer sides of the said washers, as shown by Figs. 6 and 7. The rear extremities of the levers 62 and 63 are formed with slots 74, one in each, and embrace the ratchet wheels 16 and also engage the shaft 15, as clearly shown, and on the rear extremities of the said levers 62 and 63 in rear of the ratchet wheels 16 and held in continual engagement with the latter are pawls or dogs 75 which are adjustable through the medium of a plurality of openings 76 in the levers, as clearly shown by Fig. 1, and whereby the strokes of the levers may be modified or the ratchet wheels changed from one dimension to another.

The actuating mechanism carrying the chain belts and sprocket wheels hereinbefore described may be adjusted or swung on the arcuate guides 22 either toward the shaft 15 to shorten the strokes of the levers 62 and 63, or away from the said shaft 15 and past the vertical centers of the guides 22 to lengthen the strokes of the said levers, the telescopic association of the members 65 of the main bodies of the levers 62 and 63 readily accommodating such adjustment, and, moreover, the strokes may be further modified as hereinbefore indicated by shifting the bearing blocks 35 and 36 in their respective slots 32 and 33 of the supports or carriers 28 and 29, and when these bearing blocks are shifted, shorter chain belts will be used in connection with the sprocket wheels. The extension members 65 are primarily attached in reverse positions relatively to the chain belts 47 and 57 and 47 and 58, so that when one lever is up the other is down, and by this means an alternate stroke to the levers is given by the mechanism for operating the same, and as these levers reciprocate, the pawls or dogs 75 alternately grip and slip over their ratchet wheels and regularly rotate the shaft 15 with increased power proportionate to the lengths of the levers 62 and 63 and at the same time a motion conversion is effected through the operation of the chain belts by the prime motor 9 to operate the levers 62 and 63 as desired to perform their function relatively to the shaft 15.

In Fig. 9 practically the same principle is involved for reciprocating a lever horizontally, and in this instance the chain belts and sprocket wheels are adjusted on the arcuate guides 22 so as to assume a full horizontal position, the chain belts, sprocket wheels and prime motor and its connections being indicated by similar reference characters, as in Figs. 1 to 8 inclusive, it being understood that precisely the same mechanism is used with the exception of the modification in the form of the lever which will be presently explained. The lever in this instance is designated by the reference character 77 and embodies a main member 78 which is attached to the part to be operated, such as a pump piston or a shaft as may be desired; and pivoted to the end of said lever, as at 79, is a supplemental extension lever 80 which is intermediately bent, as at 81, and also deflected, as at 82, adjacent to its outer extremity. The bends or deflections of this supplemental extension 80 of the lever are provided to permit the said extension to clear the parts of the mechanism with which it might otherwise come into engagement during the reciprocation, and the outer extremity of this supplemental extension 80 is secured to the chain belts in the same manner as the levers hereinbefore explained.

In Fig. 10 essentially the same mechanism is shown applied for operating a vertical pump 83 having a piston rod 84 rising therefrom and to which a lever 85, in all respects the equivalent of the levers heretofore described, is connected to chain belts corresponding to the chain belts 47 and 57 or 47 and 58 respectively engaging upper and lower sprocket wheels 41 and 44, and 42 and 45, the sprocket wheel 41 being mounted on a short shaft $40^a$ having a second sprocket wheel $41^a$ on its outer end. The sprocket wheel 42 is mounted on a short shaft $42^a$ having a sprocket wheel $42^b$ on its outer end, the shafts $40^a$ and $42^a$ being mounted in the upper portions of the uprights 87 which in the present instance are fixed and rise from a base 88. The lower sprocket wheels 44 and 45 are respectively mounted on short shafts $44^a$ and $45^a$ engaging bearing members or blocks in slots 86 in the uprights 87 and adjustable so as to accommodate various lengths of levers 85 or strokes of the pump piston 84 and whereby this particular application of the improved mechanism may be used with pumps having pistons of varying strokes and of different dimensions and elevations. The sprocket wheels $41^a$ and $42^b$ are uniformly driven from a motion transmitting shaft 89 mounted in upright bearings 90 rising from the base 88 and having a belt wheel 91 at the center thereof which is adapted to be actuated from a motor similar to that heretofore described. On the outer ends of the shaft 89 sprocket wheels 92 and 93 are keyed, and thereover and over the sprocket wheels $41^a$ and $42^b$ chain belts 94 and 95 are trained so that the chain belts 47 and 57 may be equally and regularly driven.

In Fig. 11 the same structure as shown by Fig. 10 is mainly used and designated by similar reference characters to operate an oscillating lever 96 having a slotted end 97 connected to the chain belts 47 and 57, the said lever 96 being intermediately engaged by a fulcrum post or support 98. This lever 96 is adapted to be connected to drilling machinery or to a drill rod or mechanism for actuating the latter or may be applied to any other vertically reciprocating means.

The improved mechanism will be found exceptionally advantageous for the purposes for which it has been devised and has a wide range of application, and it will be understood that in making various applications thereof, such changes in the proportions and dimensions as well as the minor details of construction as fairly fall within the scope of the claims will be adopted at will.

What is claimed is:

1. In a mechanism of the class specified, the combination of a prime motor, guides mounted at a distance from said motor, slotted supports movably held between said guides and having bearing devices adjustably mounted therein, upper and lower shafts engaging said bearing devices and adjustable therewith and having contiguous spaced ends, the shafts having sprocket wheels on the ends thereof, and those on the contiguous ends of the shafts having clear spaces between them, chain belts trained over the sprocket wheels of both shafts, the chain belts engaging the sprocket wheels at the contiguous ends of said shafts being separated by a clear space throughout their lines of travel, a prime motor operatively connected to the one shaft to regularly drive the shafts and said chain belts at the same rate of speed, a lever connected to the inner portions of said chain belts of said contiguous sprocket wheels and at transversely alined points relatively to said belts, and means actuated by said lever with increased power relatively to the power of the prime motor.

2. In a mechanism of the class specified, the combination of a prime motor, supports adjustably mounted to move toward and from said motor and having shafts at opposite portions provided with sprocket wheels on the inner and outer ends thereof and in alinement, chain belts trained over said sprocket wheels, cross-shafts mounted in a portion of said supports in alinement with the first named shafts and having terminal sprocket wheels spaced from the inner sprocket wheels of the latter shafts, chain belts engaging the latter sprocket wheels, mechanism between the prime motor and a portion of said shafts and sprocket wheels and operating all the sprocket wheels and belts at a uniform speed, levers connected at one end of each to different points of the inner chain belts of the pairs of shafts and the chain belts on the sprocket wheels of the cross-shafts, and a power receiving shaft having ratchet wheels thereon, the rear extremities of the levers being provided with means to engage and rotate said ratchet wheels and power receiving shaft with increased power relatively to the power of the prime motor.

3. In a mechanism of the class specified, the combination of a prime motor, supports fulcrumed at their lower portions to permit them to be moved toward and from the said motor and having shafts bearing therein and provided with sprocket wheels engaged by chain belts in part arranged in pairs adjacent to each other with clear spaces between them, the shafts extending only partially across the supports but all being in alinement with their ends in spaced relation, means between said prime motor and shafts for regularly and continuously driving the said shafts, sprocket wheels and chain belts, levers connected to transversely opposite portions of the adjacent pairs of chain belts at different points relatively to the pairs of belts, and a power receiving shaft having devices thereon for rotating the same, said devices being engaged by the levers to increase the power of said shaft relatively to the power of the prime motor.

4. In a mechanism of the class specified, the combination of a prime motor, a base having arcuate guides thereon, supports adjustably held between said guides and having shafts bearing therein and provided with sprocket wheels engaged by chain belts in part arranged in pairs adjacent to each other with clear spaces between them, means between said prime motor and shafts for regularly and continuously driving the said shafts, sprocket wheels and chain belts, levers connected to transversely opposite portions of the adjacent pairs of chain belts, the connected ends of the levers moving with the pairs of chain belts in the spaces between the latter at different points relatively to the pairs of belts, and a power receiving shaft having devices thereon for rotating the same, said devices being engaged by the levers to increase the power of said shaft relatively to the power of the prime motor.

5. In a mechanism of the class specified, the combination of a prime motor, a base having supports fulcrumed at their lower portions to permit them to be moved toward and from the said motor and held thereby and formed with slots, bearings adjustably mounted in the slots of said supports, shafts engaging said bearings and also other portions of the supports, the shafts all having sprocket wheels connected by chain belts in part arranged in adjacent pairs with clear spaces between them, means between said prime motor and shafts for regularly and continuously driving the said shafts, sprocket wheels and chain belts, levers connected to transversely opposite portions of the adjacent pairs of chain belts at different points relatively to the pairs of belts, the connected ends of the levers moving with the pairs of chain belts in the spaces between the latter, and a power receiving shaft having devices thereon for rotating the same, said devices being engaged by the levers to increase the power of said shaft relatively to the power of the prime motor.

6. In a mechanism of the class specified, the combination of a prime motor, a base having arcuate guides held thereby, supports adjustably connected to said guides and having slots therein, bearing devices adjustably mounted in said slots of the supports, shafts engaging said bearing devices and also other portions of the supports and provided with terminal sprocket wheels, chain belts trained over said sprocket wheels and arranged in part in pairs with clear spaces between them, levers with extensible members connected to transversely opposite portions of and individually at different points relatively to and freely movable between said pairs of belts, and a shaft having ratchet wheels thereon, the rear extremities of the levers provided with pawls engaging said ratchet wheels to increase the power of said latter shaft relatively to the power of said motor.

7. In a mechanism of the class specified, the combination of a prime motor, carriers fulcrumed for adjustment in arcs of circles and supporting pairs of belts with clear spaces between them, the carriers also having shafts and sprockets engaged by said belts, mechanism between said motor and belts for regularly and continuously operating the belts, a power receiving shaft, and levers interposed between and connected to the power receiving shaft and pairs of belts.

8. In a mechanism of the class specified, the combination of a prime motor, carriers mounted to swing in arcs of circles and supporting shafts with sprockets engaged by pairs of belts with clear spaces between them, mechanism between said motor and belts for regularly and continuously operating the belts, a power receiving shaft, and levers interposed between the power receiving shaft and pairs of belts and having automatically extensible members connected to transversely opposite portions of and individually at different points relatively to the said pairs of belts.

In testimony whereof I have hereunto set my hand in presence of two subscribing witnesses.

CLARENCE B. WILLIAMS.

Witnesses:
   Chas. S. Hyer,
   Chas. A. Rowe.

Copies of this patent may be obtained for five cents each, by addressing the "Commissioner of Patents, Washington, D. C."